(12) United States Patent
Bostick et al.

(10) Patent No.: US 9,767,564 B2
(45) Date of Patent: Sep. 19, 2017

(54) MONITORING OF OBJECT IMPRESSIONS AND VIEWING PATTERNS

(71) Applicant: International Business Machines Corporation, Armonk, NY (US)

(72) Inventors: James E. Bostick, Cedar Park, TX (US); John M. Ganci, Jr., Cary, NC (US); Sarbajit K. Rakshit, Kolkata (IN); Craig M. Trim, Sylmar, CA (US)

(73) Assignee: International Business Machines Corporation, Armonk, NY (US)

( * ) Notice: Subject to any disclaimer, the term of this patent is extended or adjusted under 35 U.S.C. 154(b) by 29 days.

(21) Appl. No.: 14/826,519

(22) Filed: Aug. 14, 2015

(65) Prior Publication Data
US 2017/0046841 A1    Feb. 16, 2017

(51) Int. Cl.
*G06T 7/00* (2017.01)
*G06K 9/00* (2006.01)
*G06T 11/60* (2006.01)

(52) U.S. Cl.
CPC ........ *G06T 7/0042* (2013.01); *G06K 9/00771* (2013.01); *G06T 11/60* (2013.01); *G06T 2207/10016* (2013.01); *G06T 2207/30232* (2013.01)

(58) Field of Classification Search
CPC ......... G06T 7/0042; G06T 1/60; G06T 11/60; G06T 17/05; G06T 2207/10016; G06T 2207/30232; G06K 9/00771; H04N 5/2258
USPC ....................................................... 382/103
See application file for complete search history.

(56) References Cited

U.S. PATENT DOCUMENTS

| 4,737,847 | A  | 4/1988  | Araki et al.     |
| 8,180,104 | B2 | 5/2012  | Sonoura          |
| 8,184,154 | B2 | 5/2012  | Estevez et al.   |
| 8,237,791 | B2 | 8/2012  | Chen et al.      |
| 8,331,611 | B2 | 12/2012 | Johnson, II et al. |

(Continued)

FOREIGN PATENT DOCUMENTS

| EP | 1862941 A2 | 12/2007 |
| EP | 2093999 A1 | 8/2009  |

(Continued)

OTHER PUBLICATIONS

Liu et al. "What are customers looking at?" IEEE Conference on Advanced Video and Signal Based Surveillance, Sep. 5, 2007, pp. 405-410.*

(Continued)

*Primary Examiner* — Jon Chang
(74) *Attorney, Agent, or Firm* — Isaac J. Gooshaw

(57) ABSTRACT

A method, computer program product, and computer system to determine viewing patterns of persons captured by image or video is provided. A processor retrieves one of more video feeds, wherein the one or more video feeds capture one or more people. A processor determines a viewing area for at least one person of the one or more people, wherein the viewing area is based, at least in part, on a position and viewing direction of the at least one person. A processor determines a viewed object for the at least one person of the one or more people based, at least in part, on one or more objects in an area covered by the viewing area for the at least one person of the one or more people. A processor generates a report including (i) the viewed object and (ii) the at least one person.

15 Claims, 6 Drawing Sheets

(56) References Cited

U.S. PATENT DOCUMENTS

| | | |
|---|---|---|
| 8,350,908 B2 | 1/2013 | Morris et al. |
| 8,479,246 B2 | 7/2013 | Hudson et al. |
| 8,497,906 B2 | 7/2013 | Yin et al. |
| 8,599,266 B2 | 12/2013 | Trivedi et al. |
| RE44,690 E | 1/2014 | Sollami |
| 8,989,700 B2 | 3/2015 | Cordero et al. |
| 2003/0050757 A1 | 3/2003 | Moore |
| 2008/0074494 A1 | 3/2008 | Nemethy et al. |
| 2008/0198159 A1 | 8/2008 | Liu et al. |
| 2009/0067730 A1 | 3/2009 | Schneiderman |
| 2009/0073265 A1 | 3/2009 | Greenhill et al. |
| 2011/0096149 A1 | 4/2011 | Au et al. |
| 2011/0143707 A1 | 6/2011 | Darby, Jr. et al. |
| 2011/0282542 A9 | 11/2011 | Nielsen et al. |
| 2012/0062748 A1 | 3/2012 | Ofek et al. |
| 2012/0130632 A1 | 5/2012 | Bandyopadhyay et al. |
| 2012/0140069 A1 | 6/2012 | Ding et al. |
| 2013/0265490 A1 | 10/2013 | Krig |
| 2014/0316570 A1 | 10/2014 | Sun et al. |
| 2015/0220798 A1 | 8/2015 | Miyano |
| 2015/0302500 A1* | 10/2015 | Koch ................. G06Q 30/0623 705/26.61 |
| 2016/0163080 A1 | 6/2016 | Baker et al. |
| 2016/0203499 A1* | 7/2016 | Yamashita ............ G06Q 30/02 705/7.29 |
| 2016/0224846 A1 | 8/2016 | Cardno |
| 2016/0305794 A1 | 10/2016 | Horita et al. |
| 2016/0313130 A1 | 10/2016 | Baselau et al. |
| 2016/0324664 A1 | 11/2016 | Piron et al. |

FOREIGN PATENT DOCUMENTS

| | | |
|---|---|---|
| WO | 2005120071 A2 | 12/2005 |
| WO | 2008147913 A3 | 12/2008 |
| WO | 2011002775 A1 | 1/2011 |
| WO | 2011025359 A1 | 3/2011 |
| WO | 2012082127 A1 | 6/2012 |

OTHER PUBLICATIONS

Chen et al., "3-Sweep: Extracting Editable Objects from Single Photo", published Aug 13, 2013, <https://www.youtube.com/watch?v=Oie1ZXWceqM>.

Collins, Katie, "How to create your own Google Street View from your photo spheres", Dec. 10, 2013, pp. 1-5, <http://www.wired.co.uk/news/archive/2013-12/10/make-your-own-google-street-view>.

Makris et al., "Path detection in video surveillance", Image and Vision Computing 20 (2002) 895-903, 0262-8856/02, Copyright 2002, Elsevier Science B.V., PII: S0262-8856(02)00098-7.

Sankaranarayanan et al. "Object Detection, Tracking and Recognition for Multiple Smart Cameras"; Proceedings of the IEEE; vol. 96, No. 10, © Oct. 2008, IEEE; pp. 1606-1624.

"Surveillance", from Wikipedia, the free encyclopedia, last modified on Dec. 22, 2014, pp. 1-27, <http://en.wikipedia.org/wiki/Surveillance>.

"Create your own Street View", Dec. 9, 2013, pp. 1-4, <http://google-latlong.blogspot.de/2013/12/create-your-own-street-view.html>.

U.S. Appl. No. 14/633,207; Entitled "Interactive Surveillance Overlay", filed Feb. 27, 2015.

"Interactive Surveillance Overlay", U.S. Appl. No. 15/080,749, filed Mar. 25, 2016.

IBM Appendix P, list of IBM patents or patent applications treated as related, pp. 1-2, filed Sep. 8, 2016.

* cited by examiner

MONITORING OF OBJECT IMPRESSIONS AND VIEWING PATTERNS

BACKGROUND OF THE INVENTION

The present invention relates generally to the field of computer vision, and more particularly to analysis of video footage to determine the viewing patterns of individuals captured in said footage.

Computer vision includes processing and analyzing the content of images. For example, computer vision includes identifying and determining the location of an object in a given image. Computer vision provides the ability to extract information from a variety of images data types. For example, image data includes video sequences, images from multiple cameras, or three-dimensional images from a scanner (e.g., a light detection and ranging (LIDAR) device). A type of information that can be extracted by computer vision includes an object's position and orientation, or pose of an object.

SUMMARY

Embodiments of the present invention provide a method, computer program product, and computer system to determine viewing patterns of persons captured by image or video. A processor retrieves one of more video feeds, wherein the one or more video feeds capture one or more people. A processor determines a viewing area for at least one person of the one or more people, wherein the viewing area is based, at least in part, on a position and viewing direction of the at least one person. A processor determines a viewed object for the at least one person of the one or more people based, at least in part, on one or more objects in an area covered by the viewing area for the at least one person of the one or more people. A processor generates a report including (i) the viewed object and (ii) the at least one person.

DETAILED DESCRIPTION

Figure 1:
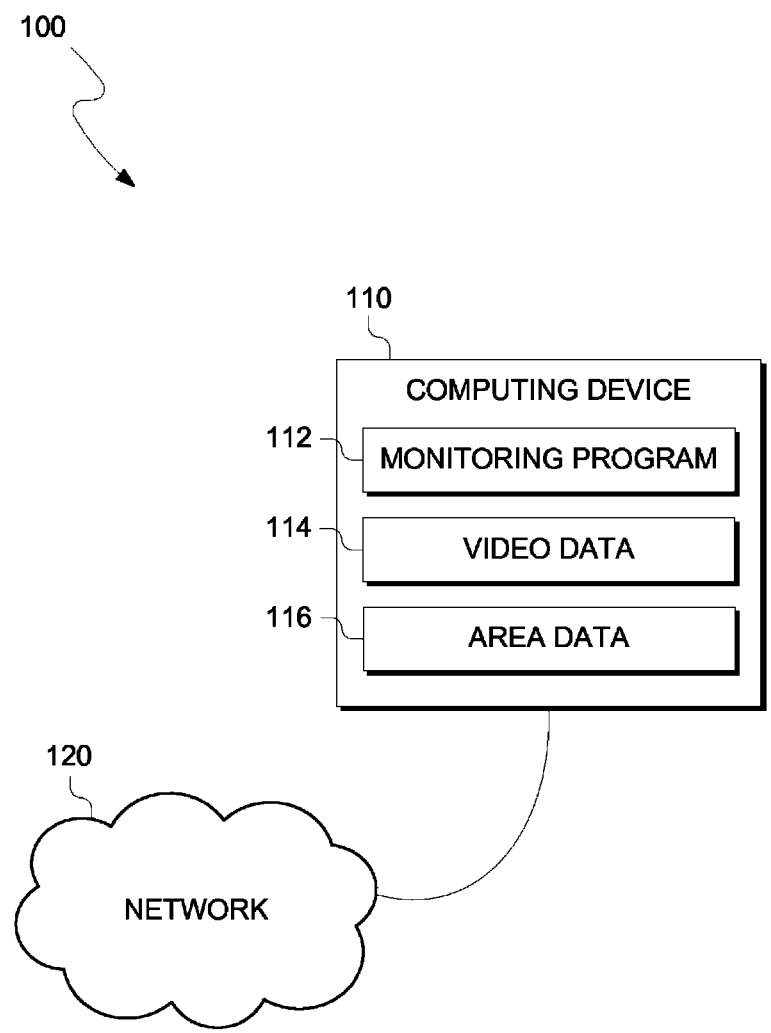
FIG. 1 is a functional block diagram illustrating a networked environment, in accordance with an exemplary embodiment of the present invention.

While solutions to computer vision and pose estimation are known, previous solutions do not provide the monitoring and reporting capabilities to determine trends or patterns of one or more individuals. Specifically, previous computer vision solutions do not account for the vision path of an individual and the viewing patterns of the vision path includes. Embodiments of the present invention recognize that by providing mechanisms to determine the viewing patterns of individuals captured by video or image, a detailed analysis of what objects each individual in the captured video or image was viewing at a given time. In some scenarios, embodiments of the present invention provide an operator of a surveillance system the ability to track individuals' viewing patterns to determine people of interest. For example, an object is stolen from a store. A surveillance operator can select a location of the object in an area covered by the surveillance footage. Embodiments of the present invention provide a report of individuals that viewed the object and, furthermore, those who viewed the object for the longest period. In these scenarios, the operator can determine particular people of interest to pursue in the theft of the object. In other scenarios of the invention, embodiments of the present invention provide a stakeholder in a retail or commercial environment to track the viewing patterns of multiple individuals to determine trends. For example, a retailer collects video footage of patrons in a store. Embodiments of the present invention provide reports regarding the frequency and duration objects located in the store were viewed by the patrons. In these scenarios, the stakeholder of the retail store could determine if a particular arrangement of goods on a store shelf create a desired impression, or viewing rate, of patrons passing by the object.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The present invention will now be described in detail with reference to the Figures. FIG. 1 is a functional block diagram illustrating networked environment, generally designated 100, in accordance with one embodiment of the present invention. Networked environment 100 includes computing device 110 connected over network 120. Computing device 110 includes monitoring program 112, video data 114 and area data 116.

In various embodiments of the present invention, computing device 110 is a computing device that can be a standalone device, a server, a laptop computer, a tablet computer, a netbook computer, a personal computer (PC), or a desktop computer. In another embodiment, computing device 110 represents a computing system utilizing clustered computers and components to act as a single pool of seamless resources. In general, computing device 110 can be any computing device or a combination of devices with access to video data 114 and area data 116 and is capable of executing monitoring program 112. Computing device 110 may include internal and external hardware components, as depicted and described in further detail with respect to FIG. 4.

In this exemplary embodiment, monitoring program 112, video data 114 and area data 116 are stored on computing device 110. However, in other embodiments, monitoring program 112, video data 114 and area data 116 may be stored externally and accessed through a communication network, such as network 120. Network 120 can be, for example, a local area network (LAN), a wide area network (WAN) such as the Internet, or a combination of the two, and may include wired, wireless, fiber optic or any other connection known in the art. In general, network 120 can be any combination of connections and protocols that will support communications between computing device 110 and other devices (not shown), in accordance with a desired embodiment of the present invention.

In various embodiments, monitoring program 112 provides an interface to view and select a variety of images or video feeds stored in video data 114. Video data 114 includes at least one video feed or image stream from a capture device such as, but not limited to, video cameras or still image cameras. In some embodiments, video data 114 includes at least one of the location, direction, or viewing angle of the capture device for stationary devices. Based on the at least one of location, direction or viewing angle, monitoring program 112 creates a capture area of the capture device. In some embodiments, monitoring program 112 receives, from the user, a capture area for a respective capture device. For capture devices that are not stationary (e.g., a device which rotates or pivots during capture), video data 114 includes the area covered by the capture device when recording the video or image stream for the frames or still images as they are captured by the capture device. In an embodiment, video data 114 includes at least one of the location, direction or viewing angle for each frame or image stored from the respective capture device. For example, when captured, video data 114 includes metadata regarding the time or location the video feed or image stream was captured. In various embodiments, video data 114 includes one or more of a time or date at which each piece of video data 114 was recorded by the respective capture device.

In various embodiments, monitoring program 112 determines the viewing patterns of people captured by video data 114. Monitoring program 112 performs object recognition to determine if a video feed or image of video data 114 contains a person. If video data 114 contains a person, then monitoring program 112 performs pose estimation to determine the position of the person and the direction the person is looking. For example, monitoring program 112 determines the location of a grouping of points on the person's body (e.g., shoulder, hands, hips, and head) to create a model of the person within a three dimensional space of the capture area of the capture device for the given video data 114 that the person is captured by. Based on the model determined by the pose estimation of the person, monitoring program 112 determines a viewing area of the person. Monitoring program 112 generates a viewing area based on the position of the model (e.g., the location of the model within the three dimensional space of the capture area) and the direction the model is facing (e.g., the direction the head of a person is looking).

In various embodiments, monitoring program 112 determines a distance and area of the viewing area of person based on the model, the capture area, and one or more rules. Monitoring program 112 includes one or more rules regarding the viewing area of a person. In one scenario, monitoring program 112 includes a rule describing the average viewing distance of a person. For example, monitoring program 112 includes a rule that a person can recognize objects up to twenty feet away. In another scenario, monitoring program 112 includes a rule describing the peripheral vision of a person. For example, monitoring program 112 includes a rule that a person can recognize objects within a twenty degree angle from the center point of the head point of the model determined by pose estimation (i.e., thereby creating a forty degree viewing cone from the location of the persons head, pointing and extending from the direction the person is looking).

In various embodiments, based on the viewing area of a person, monitoring program 112 determines if the viewing area of a person covers one or more objects at the time the video or image was captured. In some embodiments, monitoring program 112 performs object recognition to determine the location of objects within the capture area of a capture device. Based on the location of the objects, monitoring program 112 determines if the viewing area covers one or more objects. If the location of an object or objects are included in the viewing area, then monitoring program 112 determines that the person has viewed the object for the time the video or image was captured. In further embodiments, monitoring program 112 determines the focal point of the viewing area to determine an object of focus the person is viewing at time the video or image was captured. In one scenario, monitoring program 112 selects the closest object from a person in the viewing area of the person. In another scenario, monitoring program 112 selects closest to the center of a cone modeled by the viewing area of the object.

In other embodiments, the location of objects in a capture area is pre-determined and stored in area data 116. Monitoring program 112 receives a three dimensional model or models of a capture area including the location of objects within the capture area. Monitoring program 112 stores the three dimensional model or models in area data 116. In such embodiments, monitoring program 112 retrieves the location of objects from area data 116, removing the need to perform object recognition to determine the location of objects that people may be viewing. Area data 116 may also include information describing the objects such as, but not limited to, names of the objects, orientations of the objects, or a group the one or more objects belong to.

In various embodiments, monitoring program 112 performs object recognition and pose estimation for each person captured in the video feeds or image streams of video data 114. Monitoring program 112 determines the viewing area of each person and the objects viewed by each person. Monitoring program 112 determines the total amount of time each person viewed one or more objects. Monitoring program 112 provides a reporting tool to provide a report to a user regarding the viewing behaviors of the people captured in video streams or image feeds stored in video data 114.

In some embodiments, monitoring program 112 provides a report regarding the viewing area of a single person for a given time frame or location. Monitoring program 112 receives input from a user to select a person to monitor. In some scenarios, monitoring program 112 provides an interface with image captures of one or more people stored in video data 114. Monitoring program 112 provides a list of each person contained in video data 114. Monitoring program 112 receives a selection from a user of a person to monitor. In other scenarios, monitoring program 112 receives an image or video feed of a person to be monitored. Monitoring program 112 performs facial recognition on the image or video feed of a person to be monitored and, additionally, to the video or images in video data 114. Monitoring program 112 generates a model representing the face of the person (e.g., a group of feature points such as the location of the person's eyes and the distance apart) for both the received image or video and each person recognized in the images or video stored in video data 114. Monitoring program 112 compares the facial model of the received image to the facial models of each person recognized in the images or video stored in video data 114. When a match is found, monitoring program 112 selects the matched person in video data 114 for reporting and monitoring. Monitoring program 112 provides a report regarding the selected person. The report includes, but is not limited to, the objects the selected person viewed, the total amount of time the person viewed each object, and the location of the person as they moved through the capture area.

In other embodiments, monitoring program 112 provides a report regarding the viewing area of multiple people for a given time frame or location. As discussed herein, Monitoring program 112 determines the viewing area of each person recognized in video data 114. Monitoring program 112 provides a report of the viewing area and objects viewed for each person. For example, monitoring program 112 provides a listing of the total time each object was viewed either by all people or each person. As another example, monitoring program 112 provides an overlay of a heat map onto video data 114. For objects with higher amounts of total view time from all people in video data 114, monitoring program 112 generates an overlay with a darker gradient for the viewed objects. For objects with lower amounts of total view time from all people, monitoring program 112 generates an overlay with a lighter gradient for the viewed objects.

Figure 2:
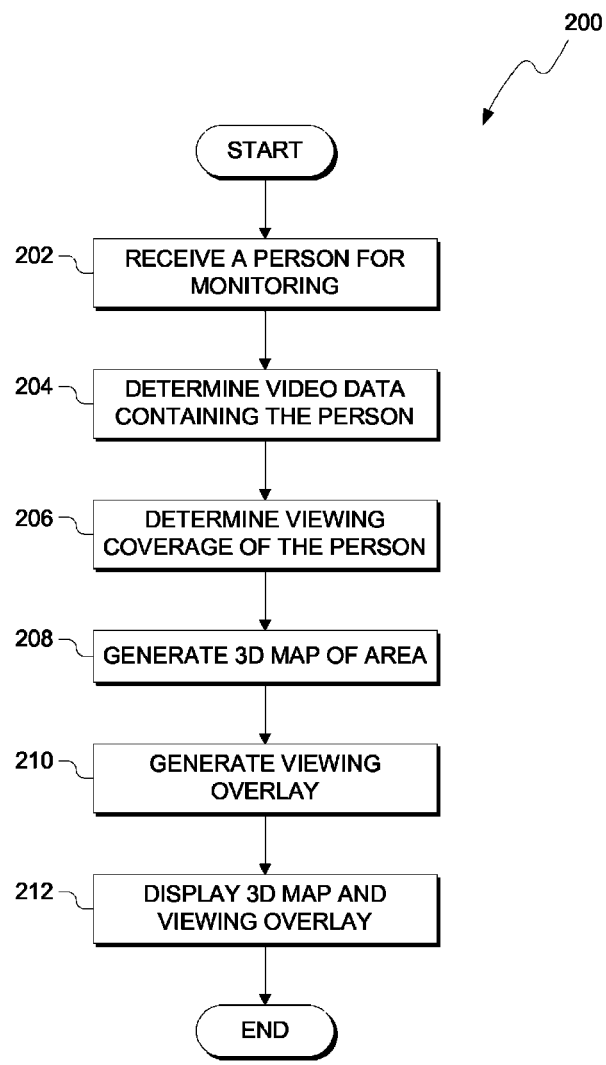
FIG. 2 illustrates operational processes of a monitoring program for determining a viewing area and objects viewed for a person, on a computing device within the environment of FIG. 1, in accordance with an embodiment of the present invention.

FIG. 2 illustrates operational processes, generally designated 200, of monitoring program 112 for determining a viewing area and objects viewed for a person, on computing device 110 within networked environment 100 of FIG. 1, in accordance with an embodiment of the present invention.

In process 202, monitoring program 112 receives a person for monitoring. In some embodiments, monitoring program 112 recognizes the faces of people in video data 114. Monitoring program 112 generates a capture of the faces of the people. Monitoring program 112 provides a list of the faces captured to provide a selection of people to monitor. In other embodiments, monitoring program 112 receives an image of the face of a person to monitor. Monitoring program 112 performs facial recognition to generate a model of the face received. Monitoring program 112 generates a facial model for each person in video data 114. Monitoring program 112 matches the model of the face received for monitoring to the facial model for each person in video data 114. When a match is found, monitoring program 112 selects the matched person for monitoring.

In process 204, monitoring program 112 determines the video data containing the selected person. Monitoring program 112 compares the images of the selected persons face to the images or video stored in video data 114. For each video or image the selected person is determined to be captured, monitoring program 112 determines the viewing area of the person (process 206). In process 206, monitoring program 112 determines a pose estimation of the person for each frame of video or image. Based on the direction the person is facing and the location of the person in the capture area, monitoring program 112 determines an area the person is viewing. In some embodiments, monitoring program 112 applies additional rules to determine the viewing area of the person. For example, a maximum viewing distance and peripheral viewing angle are included by monitoring program 112 to determine the viewing area of the person.

In process 208, monitoring program 112 generates a three-dimensional map of the area. Monitoring program 112 retrieves area data 116 for the capture area of each device that captured the monitored person. Based on the viewing area of the person determined in process 206, monitoring program 112 determines the objects that the person viewed, including the amount of time the object was viewed. In process 210, monitoring program 112 generates an overlay onto the three-dimensional map of the area. For objects that were viewed for a higher amount of time, a darker color or gradient is displayed for the objects. For objects that were viewed for a lower amount of time, a lighter color or gradient is displayed for the objects. In process 212, monitoring program 112 displays the three-dimensional map and the viewing overlay. Monitoring program 112 receives input from the user to move around the three-dimensional map. As a user navigates the three-dimensional map, monitoring program 112 updates the overlay to reflect the viewing time of the objects currently in the perspective of the three-dimensional map.

Figure 3:
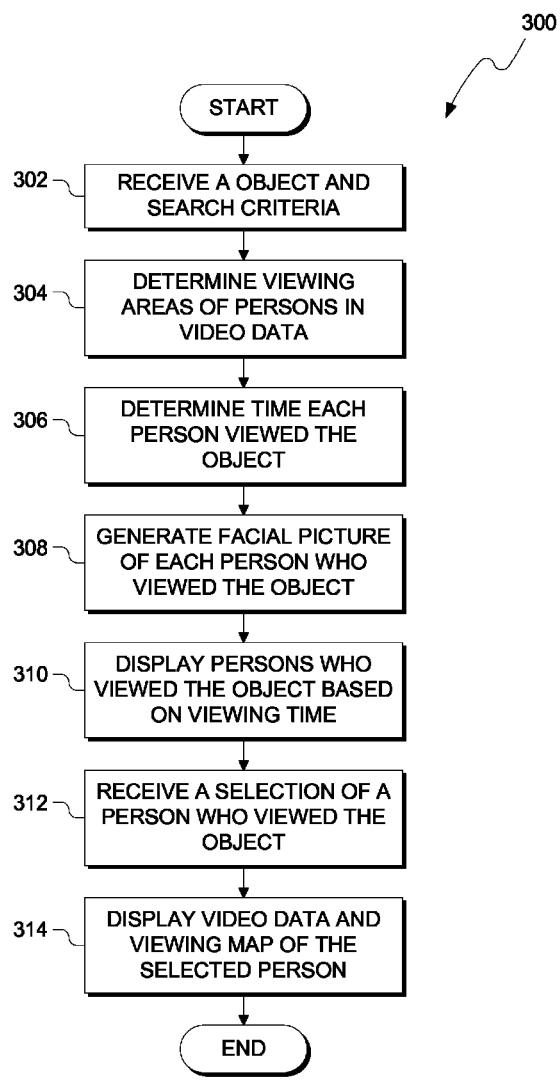
FIG. 3 illustrates operational processes of a monitoring program for determining the viewed objects for persons, on a computing device within the environment of FIG. 1, in accordance with an embodiment of the present invention.

FIG. 3 illustrates operational processes, generally designated 300, of monitoring program 112 for determining the viewed objects for persons, on computing device 110 within networked environment 100 of FIG. 1, in accordance with an embodiment of the present invention.

In process 302, monitoring program 112 receives an object and search criteria to provide a report. In some embodiments, monitoring program 112 receives a location of an object within the capture area. In other embodiments, monitoring program 112 receives an image of the object. Monitoring program 112 performs object recognition between the received image of the object and objects captured in video data 114. Monitoring program 112 selects objects in video data 114 that match the received image of the object. In further embodiments, monitoring program 112 receives other search criteria such as a time frame or capture area to limit search, analysis and reporting of video data 114.

In process 304, monitoring program 112 determines the viewing area of all persons in video data 114. In embodiments where search criteria is provided, monitoring program 112 limits the determination of the viewing area of persons the criteria (e.g., persons who appear during a certain time frame or persons who a present in a certain capture area). In process 306, monitoring program 112 determines the total time amount of time each person viewed the object selected in process 302. Based on the viewing area and the selected rules, monitoring program 112 determines if the viewing area of each person focused on the selected object and the amount of time of the focus.

In process 308, monitoring program 112 generates a facial picture of each person who viewed the object. Monitoring program 112 generates the facial picture based on captured video in video data 114. Monitoring program 112 extracts images from the video feed or image streams of video data 114. Monitoring program 112 selects the extracted image where the person is facing a capture device. If such an image is not present in video data 114, then monitoring program 112 selects the extracted image that is closest to facing a capture device. In process 310, monitoring program 112 displays all persons who have viewed the selected objects, using the extracted image of each person generated in process 308. In some embodiments, monitoring program 112 displays the persons who viewed the objects based on the total amount of viewing time each person had of the object. In process 312, monitoring program 112 receives a selection of a person. Based on the selected person, monitoring program 112 retrieves all video data containing the person and provides links to select each video feed or image stream of the person. In process 314, monitoring program 112 provides a three-dimensional map displaying the movements and viewing area of the person.

Figure 4:
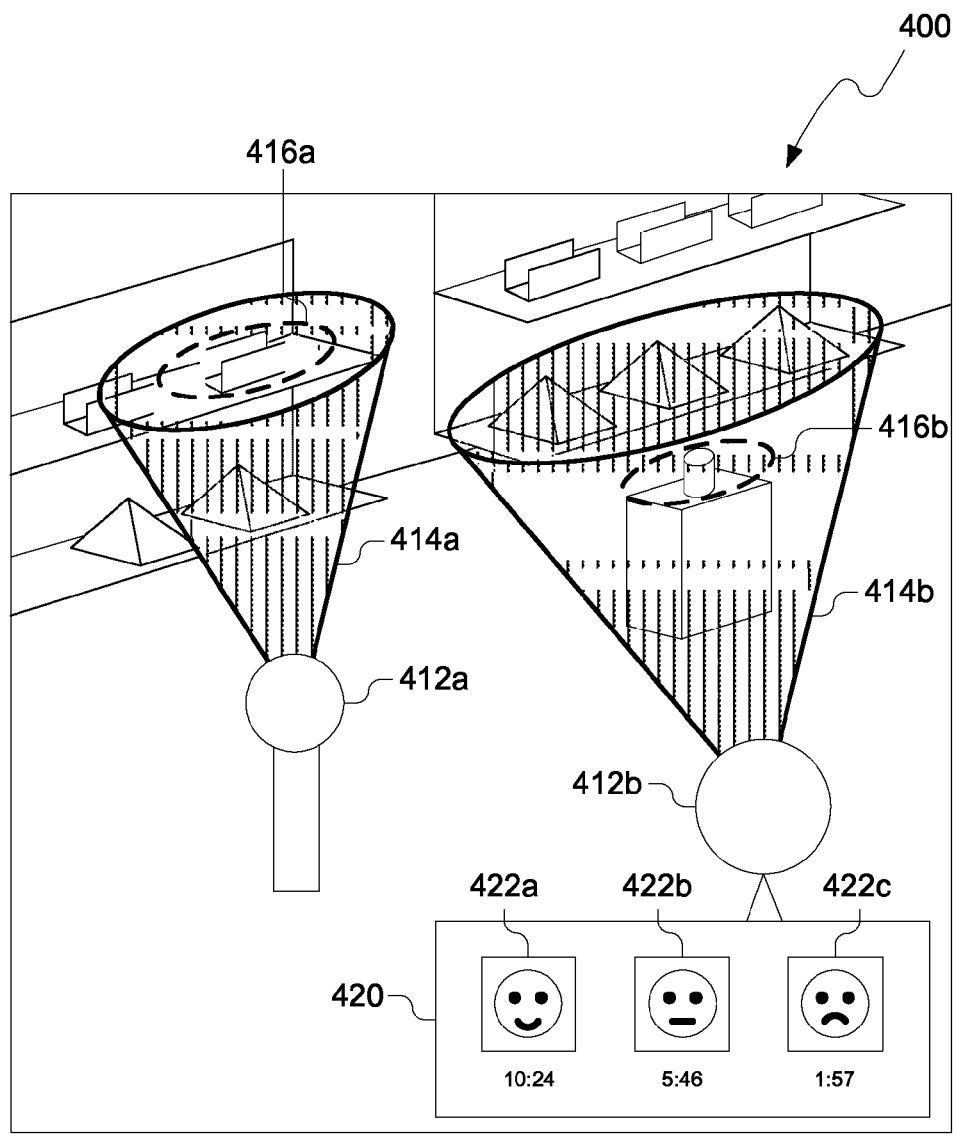
FIG. 4 depicts an example visualization of viewing areas for persons in a capture area, in accordance with an embodiment of the present invention.

FIG. 4 depicts example visualization 400 of viewing areas 414a-b for persons 412a-b in a capture area, in accordance with an embodiment of the present invention. In this example, an image or frame of video from video data 114 is depicted, with the frame or image covering a capture area. The capture area includes a first person 412a, a second person 412b, and a variety of objects in this given frame or image. While not shown, video data 114 may include captured images or video of other persons depicted in visualization 400. Area data 116 includes the location and types of objects in the capture area. Visualization 400 depicts respective viewing areas 414a-b for each person 412a-b. As discussed herein, monitoring program 112 determines a viewing area for each person captured in video data 114. For video streams, monitoring program 112 determines a viewing area for each frame of the video stream. Monitoring program 112 determines if each person captured in video data 114 is viewing an object during each frame or image. Monitoring program 112 determines that an object is viewed by a person based on the viewing area for the person and the location of objects within the capture area as stored in area data 116. Monitoring program 112 determines a location of the person's head and a direction the person's head is facing. Based on the location and direction the person is facing, monitoring program 112 determines a viewing area.

Viewing areas 414*a*-*b* represent cones of vision for each person. Monitoring program 112 includes a set of rules to determine the shape and distance of each viewing area 414*a*-*b*. In this example, monitoring program 112 includes two rules when determining viewing areas 414*a*-*b*, a rule for projecting the cone of vision and a rule for the distance of the cone. A first rule describes the range or viewing angle a person may have from the person's head. For example, monitoring program 112 projects a viewing area at a 30° angle from the location of the person's head in direction the person's head is facing. Another rule may have different viewing angle for horizontal projections and vertical projections. For example, for projections closer to the person's horizontal periphery (e.g., left and right sides of the person's head) a larger amount (e.g., 45°) may be used. For projections closer to the person's vertical periphery (e.g., top and bottom sides of the person's head) a smaller amount (e.g., 15°) may be used. A second rule determines the length or distance the cone is projected based on the determined viewing angles in the first rule. For example, a rule may limit the distance of the cone of vision to a predetermined amount (e.g., ten feet). Another rule may vary the distance the cone is projected based on the environment of the capture area the person is currently located (e.g., an indoor area may have a shorter projection than an outdoor area). One of ordinary skill in the art will recognize that many different factors can affect the viewing area of a person and, as such, can be included in the rules for determine the shape and distance of a viewing area to provide a more accurate determination of the viewing area of the person.

In a first scenario of visualization 400, monitoring program 112 determines viewing area 414*a*, as discussed herein, with respects to person 412*a*. Monitoring program 112 compares the determined viewing area 414*a* to the location of objects in area data 116. For objects that are within viewing area 414*a*, monitoring program 112 determines which object person 412*a* is viewing for the given image or frame of video. In this scenario, monitoring program 112 determines which object person 412*a* based on the closest object to the center of viewing area 414*a* (i.e., object 416*a*). In a second scenario of visualization 400, monitoring program 112 determines viewing area 414*b* with respects to person 412*b*. As with the previous scenario, monitoring program 112 compares the determined viewing area 414*b* to the location of objects in area data 116. In this scenario, an object is located in front of a group of objects, thereby obstructing person 412*b* from viewing the group of objects. When objects are closer in viewing area 414*b* to a person, then the object may be the object viewed by person 412*b*. As with the first scenario, monitoring program 112 also compares how close objects within viewing area 414*b* are to the center of viewing area 414*b*. If an object is closer to person 412*b* but further from the center of view of person 412*b* (e.g., close to the viewing periphery of person 412*b*), then monitoring program 112 determines the object is not being viewed. In this scenario the object blocking the view of other objects is close to the center of viewing area 414*b* and, as such, monitoring program 112 selects the objects as the viewed object 416*b*.

Visualization 400 depicts viewing areas 414*a*-*b* as overlays onto a frame or image of video data 114. Monitoring program 112 displays video or images of video data 114 of the capture area. A user selects different images or video feeds of video data 114 for viewing. While not shown in visualization 400, monitoring program 112 provides a video or image viewing interface to provide a user with an interface to image and videos from video data, as well as player controls for video streams to play, pause, advance or rewind a video stream. As images or video streams are presented to the user, monitoring program 112 overlays any determined viewing areas, such as viewing areas 414*a*-*b*, for persons currently captured by the displayed images or video streams. Additionally, if a person is currently viewing an object, then monitoring program 112 highlights or provides another indication that the object is being viewed, such as the dashed-line circles for viewed objects 416*a*-*b*.

Visualization 400 depicts viewer list 420, which includes interface elements viewers 422*a*-*c*. In this example, monitoring program 112 receives an object, or group of objects, to provide a list of viewers who viewed the object. Monitoring program 112 determines the overall duration each person viewed the object. For video streams, monitoring program 112 determines that for each frame of video that a person views an object, the time spent viewing the object is the time covered by the frame. For example in a thirty frames-per-second video stream, monitoring program 112 increases the overall duration a person viewed the object for the duration of each frame the object was viewed (i.e., one-thirtieth of a second). For image steams, monitoring program 112 determines the time between when the images were taken. For example, if a capture device takes an image every five seconds, then for each image that a person views the object monitoring program 112 increases the duration viewed by the time between when the images where taken. In some scenarios, monitoring program 112 receives one or more search parameters, such as a range of times or locations, to limit viewer list 420 to relevant persons who are captured in video data 114.

Upon determination of the duration each person viewed the selected object or group off objects, monitoring program 112 generates viewer list 420. Viewer list 420 provides a list of viewers 422*a*-*c* who viewed the object. Viewer list 420 includes images of each person presented in the list for quick identification of the person. In some scenarios, monitoring program 112 analyzes each frame or image of a viewer in video data 114. Monitoring program 112 determines if any frames or images contain a portrait or direct view of the person. Monitoring program 112 extracts from the image a headshot of the person for display in viewer list 420. When multiple images are detected, monitoring program 112 selects the with a clearer view of the face of the person, such as video or images that were taken at a close distance or video or images capturing the person facing more directly into the capture device.

In visualization 400, monitoring program 112 orders viewers 422*a*-*c* based on the overall duration each respective viewer viewed the object. Viewers 422*a*-*c* who viewed the object for the longest duration are presented in viewer list 420 before those with lower viewing durations. In some scenarios, motoring program 112 displays a duration of viewing along with the headshots of each of the viewers 422*a*-*c*. By displaying viewers 422*a*-*c* in order of duration that said viewer viewed the object, monitoring program 112 provides people of interest with regards to a particular object. In an inventory control implementation, a security officer could quickly find a person who viewed a stolen object for the longest period of time. In a marketing implementation, a marketer could quickly find persons who viewed an object for the longest duration and create marketing metrics without intruding on a customer. The non-intrusive nature, provides more accurate metrics about a customer's viewing habits in a natural shopping environment without bothering or influencing a customer by taking a traditional survey.

In some scenarios, monitoring program 112 receives a selection of a viewer 422a-c. Upon the selection, monitoring program 112 displays a map of the capture area. Monitoring program 112 displays the movements and viewing areas of the person throughout the capture area. As such, monitoring program 112 provides to the user the recorded movements of a particular user throughout the capture area, including before the object was viewed, the time the object was viewed, and after the object was viewed. Other information may be provided by monitoring program 112, such any identifying information about the viewer.

Figure 5:
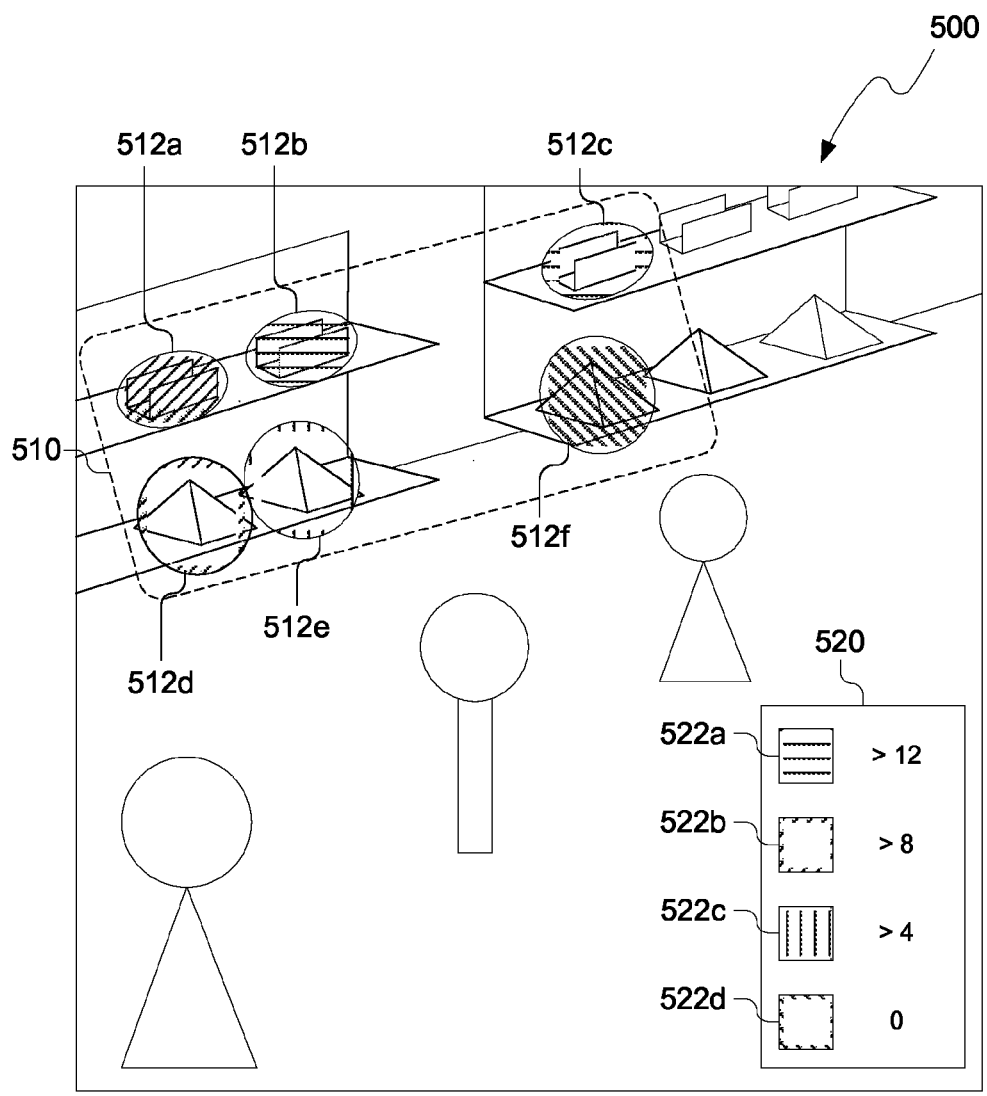
FIG. 5 depicts an example visualization of viewing impressions for persons in a capture area, in accordance with an embodiment of the present invention.

FIG. 5 depicts example visualization 500 of viewing impressions 510 for persons in a capture area, in accordance with an embodiment of the present invention. Visualization 500 includes two overlays, heat map 510 and heat map legend 520. In this example, monitoring program 112 displays the overlays over video data 114. As a user is observing video data 114 (e.g., playing a video or viewing images), monitoring program 112 displays the overlays over objects within the capture area as viewed from the capture device from which video data 114 is provided. In another example, monitoring program 112 generates a three-dimensional map for a user to navigate. As discussed herein, area data 116 includes the location of objects and other landmarks or fixtures of a capture area. Monitoring program 112 generates a three-dimensional render of the capture area. As a user navigates the three-dimensional map, monitoring program 112 updates the display of overlays to reflect the position and location of monitored objects in the current displayed view of the three-dimensional map.

In visualization 500, monitoring program 112 generates heat map 510 indicating the number of people who viewed an object in the capture area, as indicated by video data 114. In some scenarios, monitoring program 112 limits the displayed heat map 510 by one or more search parameters, such as a specific time range or location within the capture area. Monitoring program 112 determines the viewing areas and objects viewed by persons captured in video data 114 that meet the search parameters. Another search parameter limits the included persons who viewed an object based on the length of time they viewed said object. When a person views an object for longer than the search parameter, monitoring program 112 determines the viewing of the object by the person has created an impression, and as a result is included in the heat map. If a person does not view an object above for longer than the search parameter, then monitoring program 112 does not include the viewing in heat map 510.

For each object in the located within the current view of visualization 500, monitoring program 112 generates an overlay gradient. Overlay gradients 512a-f represent the number of impressions an object had for the given search parameters. Legend 520 represents the values associated with type of overlay gradient. Legend 520 includes gradient 522a, which represents more than twelve impressions that meet the search parameters; gradient 522b, which represent more than eight impressions; gradient 522c, which represents more than four impressions; and gradient 522d, for which no impressions were determined to meet the search parameters.

By displaying the number of impressions objects in the capture area had, monitoring program 112 provides valuable marketing information for a stakeholder associated with the capture area. For example, capture area includes a store that sells a variety of products. The location and type of products is stored in area data 116. Video data 114 includes captured video of patrons browsing and shopping at the store. As discussed herein, monitoring program 112 determines which patrons viewed the products located in the store. Additionally, monitoring program 112 determines the amount of time the patrons viewed said products. As such, monitoring program 112 provides heat map 510 to indicate which products were viewed more frequently than other products, or groups of products. In one scenario in reference to visualization 500, two product groups are displayed on a top shelf and bottom shelf respectively. Monitoring program 112 displays overlay gradients 512a-c over the first product group on the top shelf and overlay gradients 512d-f for the product group on the bottom shelf. As illustrated by legend 520, the products offered on the top shelf garnered (i.e., as indicated by overlay gradients 512a-c) garnered more impressions that the products on the bottom shelf (i.e., as indicated by overlay gradients 512d-f). As such, the products indicated by overlay gradients 512d-f may be less popular with patrons of the store. In response, a stakeholder of the store may determine that the products should no longer be offered by the store. In another scenario, the similar products of the top shelf indicate that location of said products may increase the number of impressions. Overlay gradients 512b and 512c indicate a higher number of impressions for the respective products than the product indicated by overlay gradient 512a. In response, a stakeholder of the store may determine that the location of the products influence the impressions garnered by patrons of the store (e.g., products on the end of displays increase the viewing by patrons).

One of ordinary skill in the art will appreciate that any type of reports or overlays may be generated by monitoring program 112 without deviating from the invention. For example, the reports do not need to be visual in nature. Printouts of impressions rates, average viewing time, and the like may be presented to a stakeholder in a table to be exported and analyzed by other devices or programs (not shown). Additionally, other visual indicators than gradients may be used when monitoring program 112 provides a visualization of objects viewed within a capture area. For example, different colors may highlight objects based on impression rates or viewing times.

Figure 6:
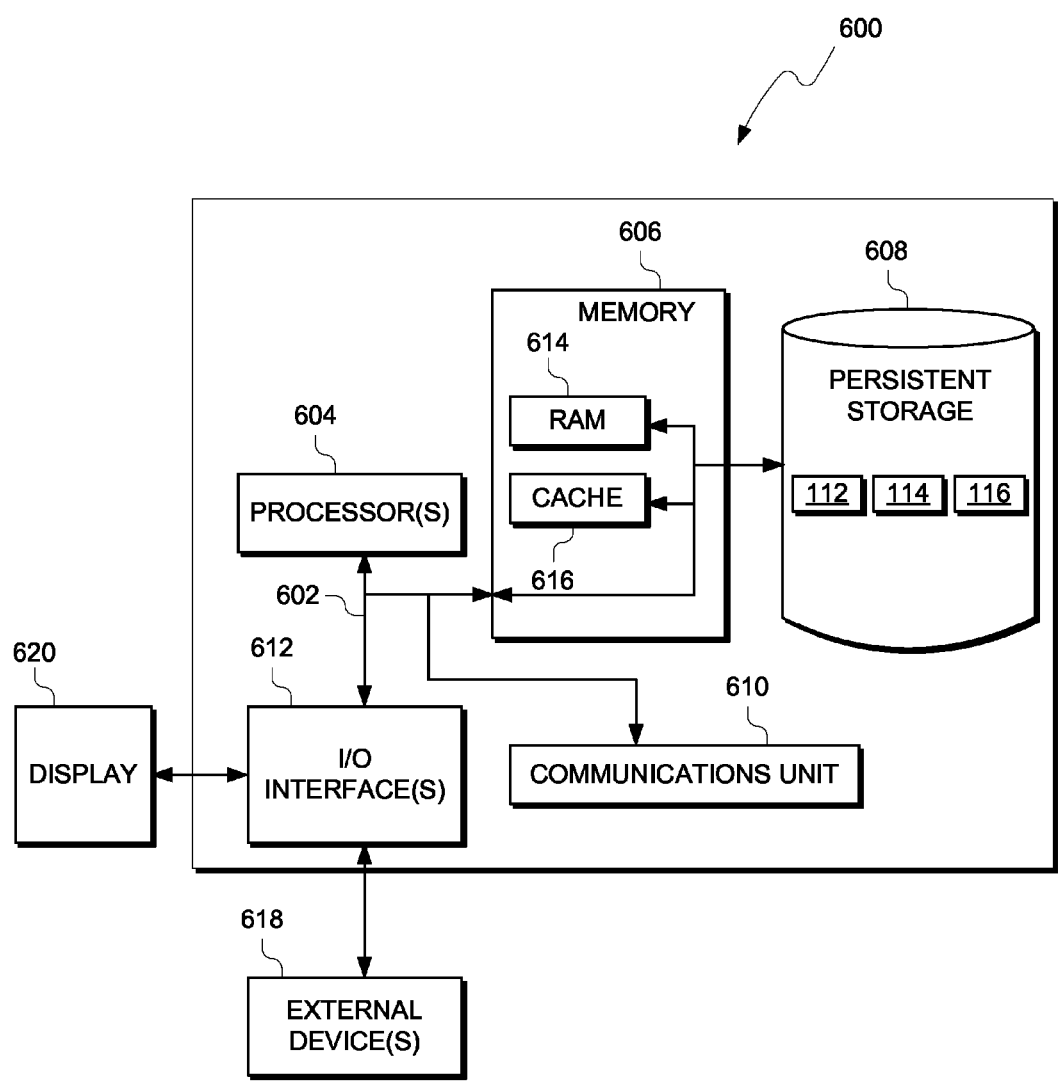
FIG. 6 depicts a block diagram of components of the computing device executing a monitoring program, in accordance with an exemplary embodiment of the present invention.

FIG. 6 depicts a block diagram, 600, of components of computing device 110, in accordance with an illustrative embodiment of the present invention. It should be appreciated that FIG. 6 provides only an illustration of one implementation and does not imply any limitations with regard to the environments in which different embodiments may be implemented. Many modifications to the depicted environment may be made.

Computing device 110 includes communications fabric 602, which provides communications between computer processor(s) 604, memory 606, persistent storage 608, communications unit 610, and input/output (I/O) interface(s) 612. Communications fabric 602 can be implemented with any architecture designed for passing data and/or control information between processors (such as microprocessors, communications and network processors, etc.), system memory, peripheral devices, and any other hardware components within a system. For example, communications fabric 602 can be implemented with one or more buses.

Memory 606 and persistent storage 608 are computer-readable storage media. In this embodiment, memory 606 includes random access memory (RAM) 614 and cache memory 616. In general, memory 606 can include any suitable volatile or non-volatile computer-readable storage media.

Monitoring program 112, video data 114 and area data 116 are stored in persistent storage 608 for execution and/or access by one or more of the respective computer processors 604 via one or more memories of memory 606. In this embodiment, persistent storage 608 includes a magnetic hard disk drive. Alternatively, or in addition to a magnetic hard disk drive, persistent storage 608 can include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 608 may also be removable. For example, a removable hard drive may be used for persistent storage 608. Other examples include optical and magnetic disks, thumb drives, and smart cards that are inserted into a drive for transfer onto another computer-readable storage medium that is also part of persistent storage 608.

Communications unit 610, in these examples, provides for communications with other data processing systems or devices, including resources of network 120. In these examples, communications unit 610 includes one or more network interface cards. Communications unit 610 may provide communications through the use of either or both physical and wireless communications links. Monitoring program 112, video data 114 and area data 116 may be downloaded to persistent storage 608 through communications unit 610.

I/O interface(s) 612 allows for input and output of data with other devices that may be connected to computing device 110. For example, I/O interface 612 may provide a connection to external devices 618 such as a keyboard, keypad, a touch screen, and/or some other suitable input device. External devices 618 can also include portable computer-readable storage media such as, for example, thumb drives, portable optical or magnetic disks, and memory cards. Software and data used to practice embodiments of the present invention, e.g., monitoring program 112, video data 114 and area data 116, can be stored on such portable computer-readable storage media and can be loaded onto persistent storage 608 via I/O interface(s) 612. I/O interface(s) 612 also connect to a display 620.

Display 620 provides a mechanism to display data to a user and may be, for example, a computer monitor, or a television screen.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

It is to be noted that the term(s) "Smalltalk" and the like may be subject to trademark rights in various jurisdictions throughout the world and are used here only in reference to the products or services properly denominated by the marks to the extent that such trademark rights may exist.

What is claimed is:

1. A method comprising:
retrieving, by one or more processors, one of more video feeds, wherein the one or more video feeds capture one or more people;
determining, by the one or more processors, a viewing area for at least one person of the one or more people, wherein the viewing area is based, at least in part, on a position and viewing direction of the at least one person;
determining, by the one or more processors, one or more viewed objects for the at least one person of the one or more people based, at least in part, on one or more objects in an area covered by the viewing area for the at least one person of the one or more people;
receiving, by the one or more processors, a selection of an object of the one or more viewed objects;
in response to the selected object being within a predetermined range of the at least one person, generating, by the one or more processors, an overlay indicating a number of people captured in the one or more video feeds that viewed the selected object, wherein the number of people captured in the one or more video feeds are sorted based on one or more search parameters; and
generating, by the one or more processors, a report including information indicative of (i) the one or more viewed objects and (ii) the at least one person.

2. The method of claim 1, wherein the viewing area is further based, at least in part, on one or more rules including at least one of (i) a predetermined viewing angle or (ii) a predetermined viewing distance.

3. The method of claim 2, wherein the one or more viewed objects are located within a predetermined distance of a center point in the viewing area.

4. The method of claim 2, wherein the one or more viewed objects are located between the position of the at least one person and one or more objects, and wherein the one or more viewed objects obstructs a view of the one or more objects by the at least one person.

5. The method of claim 1, the method further comprising:
receiving, by the one or more processors, a selection of a person captured in the one or more video feeds;
generating, by the one or more processors, a map, wherein the map indicates one or more viewing areas of the person captured in the one or more video feeds.

6. A computer program product comprising:
one or more computer-readable storage media and program instructions stored on the one or more computer-readable storage media, the program instructions comprising:
program instructions to retrieve one of more video feeds, wherein the one or more video feeds capture one or more people;
program instructions to determine a viewing area for at least one person of the one or more people, wherein the viewing area is based, at least in part, on a position and viewing direction of the at least one person;
program instructions to determine one or more viewed objects for the at least one person of the one or more people based, at least in part, on one or more objects in an area covered by the viewing area for the at least one person of the one or more people;
program instructions to receive a selection of an object of the one or more viewed objects;
in response to the selected object being within a predetermined range of the at least one person, program instructions to generate an overlay indicating a number of people captured in the one or more video feeds that viewed the selected object, wherein the number of people captured in the one or more video feeds are sorted based on one or more search parameters; and program instructions to generate a report including information indicative of (i) the one or more viewed objects and (ii) the at least one person.

7. The computer program product of claim 6, wherein the viewing area is further based, on at least in part, on one or more rules including at least one of (i) a predetermined viewing angle or (ii) a predetermined viewing distance.

8. The computer program product of claim 7, wherein the one or more viewed objects are located within a predetermined distance of a center point in the viewing area.

9. The computer program product of claim 7, wherein the one or more viewed objects are located between the position of the at least one person and one or more objects, and wherein the one or more viewed objects obstructs a view of the one or more objects by the at least one person.

10. The computer program product of claim 6, the program instructions further comprising:

program instructions to receive a selection of a person captured in the one or more video feeds;

program instructions to generate a map, wherein the map indicates one or more viewing areas of the person captured in the one or more video feeds.

11. A computer system comprising:

one or more computer processors;

one or more computer readable storage media; and program instructions stored on the computer readable storage media for execution by at least one of the one or more processors, the program instructions comprising:

program instructions to retrieve one of more video feeds, wherein the one or more video feeds capture one or more people;

program instructions to determine a viewing area for at least one person of the one or more people, wherein the viewing area is based, at least in part, on a position and viewing direction of the at least one person;

program instructions to determine one or more viewed objects for the at least one person of the one or more people based, at least in part, on one or more objects in an area covered by the viewing area for the at least one person of the one or more people;

program instructions to receive a selection of an object of the one or more viewed objects;

in response to the selected object being within a predetermined range of the at least one person, program instructions to generate an overlay indicating a number of people captured in the one or more video feeds that viewed the selected object, wherein the number of people captured in the one or more video feeds are sorted based on one or more search parameters; and program instructions to generate a report including information indicative of (i) the one or more viewed objects and (ii) the at least one person.

12. The computer system of claim 11, wherein the viewing area is further based, on at least in part, on one or more rules including at least one of (i) a predetermined viewing angle or (ii) a predetermined viewing distance.

13. The computer system of claim 12, wherein the one or more viewed objects are located within a predetermined distance of a center point in the viewing area.

14. The computer system of claim 12, wherein the one or more viewed objects are located between the position of the at least one person and one or more objects, and wherein the one or more viewed objects obstructs a view of the one or more objects by the at least one person.

15. The computer system of claim 11, the program instructions further comprising:

program instructions to receive a selection of a person captured in the one or more video feeds;

program instructions to generate a map, wherein the map indicates one or more viewing areas of the person captured in the one or more video feeds.

\* \* \* \* \*